United States Patent [19]

Negri et al.

[11] Patent Number: 4,744,707

[45] Date of Patent: May 17, 1988

[54] METHOD FOR AUTOMATIC CHANGEOVER OF THE WORKHOLDING DEVICE IN HOBBING MACHINES, AND MEANS FOR THE IMPLEMENTATION OF SUCH A METHOD

[75] Inventors: Roberto Negri, San Lazzaro di Savena; Mario Serra, Bologna, both of Italy

[73] Assignee: C.I.M.A. Costruzioni Italiane Macchine Attrezzi S.p.A., Castenaso, Italy

[21] Appl. No.: 870,171

[22] Filed: Jun. 3, 1986

[30] Foreign Application Priority Data

Jul. 10, 1985 [IT] Italy ................................ 3494 A/85

[51] Int. Cl.[4] ............................................. B23F 23/04
[52] U.S. Cl. ................................. 409/7; 51/215 AR; 409/12; 409/62; 409/137
[58] Field of Search ................... 409/1, 7, 12, 137, 11, 409/18, 19, 49, 20, 22, 23, 62; 414/744 A; 51/95 GH, 215 AR, 287

[56] References Cited

U.S. PATENT DOCUMENTS 2,995,068  8/1961  Mills .................................. 409/7
3,541,921 11/1970  Helfer et al. ..................... 409/7

Primary Examiner—Z. R. Bilinsky
Attorney, Agent, or Firm—Balogh, Osann, Kramer, Dvorak, Genova & Traub

[57] ABSTRACT

A method is disclosed which envisages the use of a vertical axis equipment magazine with a number of stations, each occupied by a workholding device, and a change arm that is rotatable through a horizontal plane and which picks up devices singly from the magazine and transfers them to a work rest. The work rest itself is provided with a flat horizontal surface and a vertical cylindrical surface serving to support and locate the device, respectively, and a scraper is employed for the purpose of keeping these surfaces clean. A sensor detects any error in the position of the workholding device relative to the two surfaces.

15 Claims, 3 Drawing Sheets

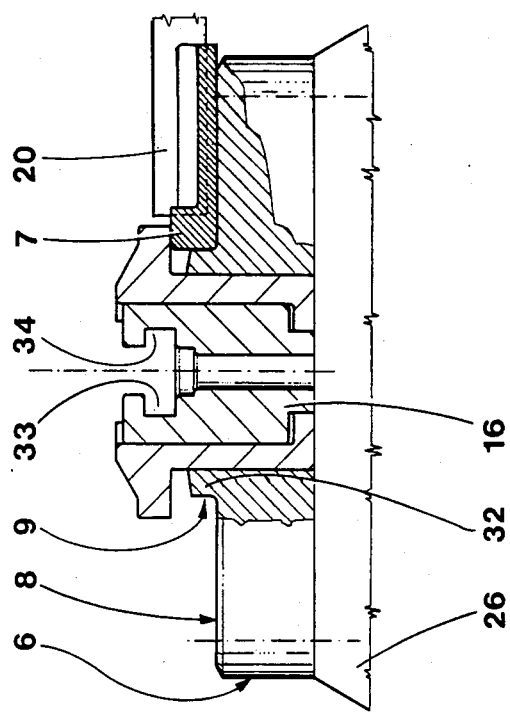
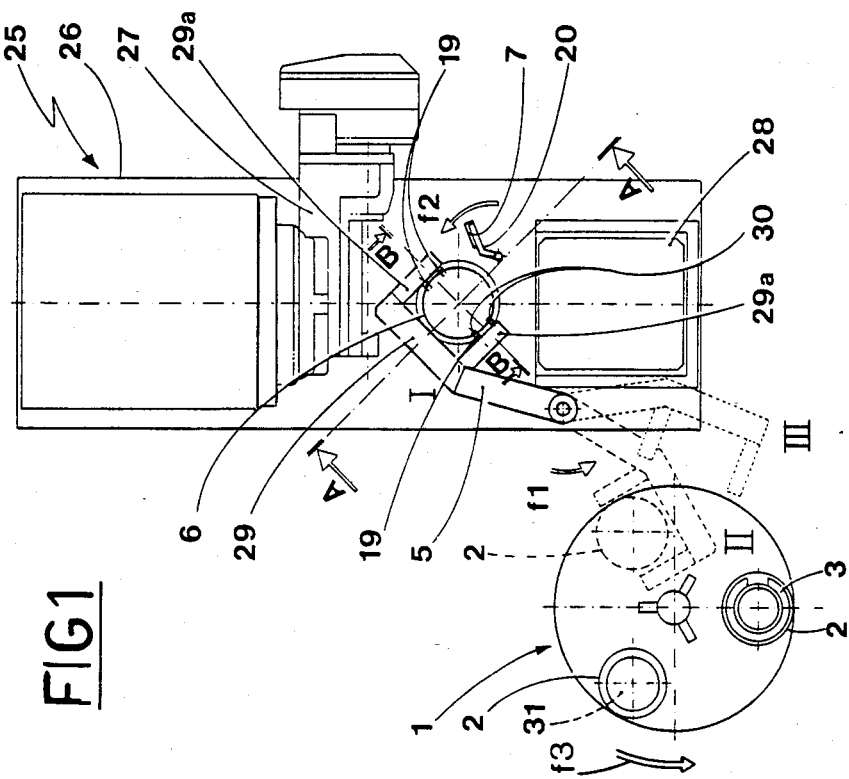

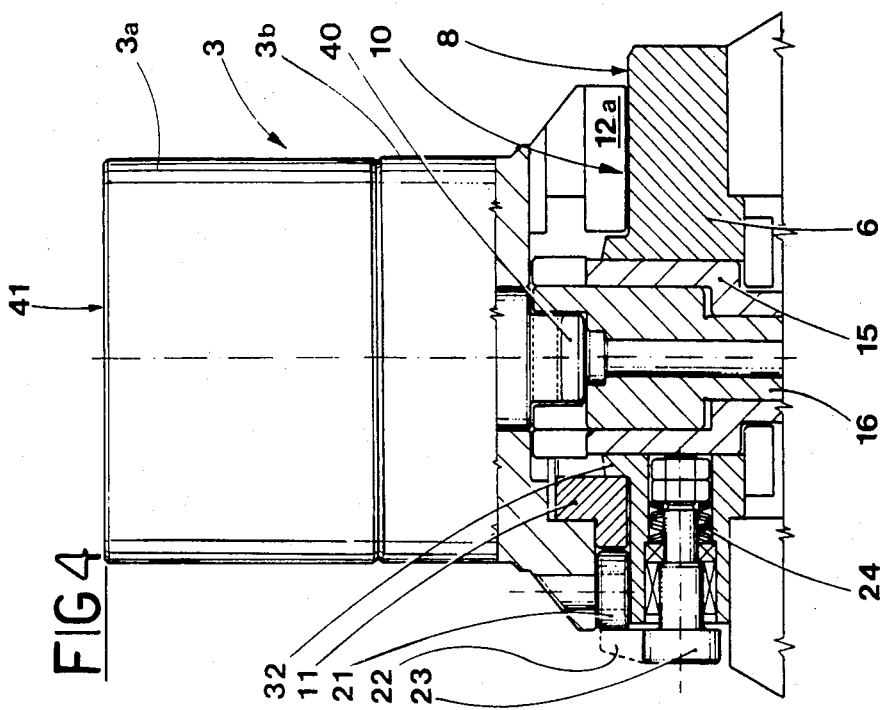
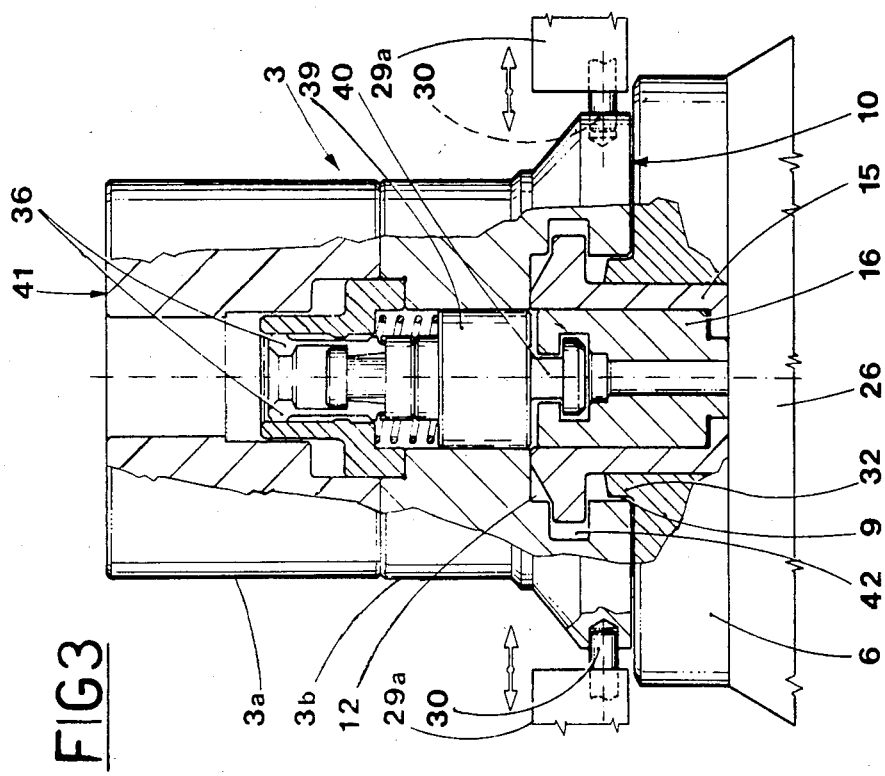

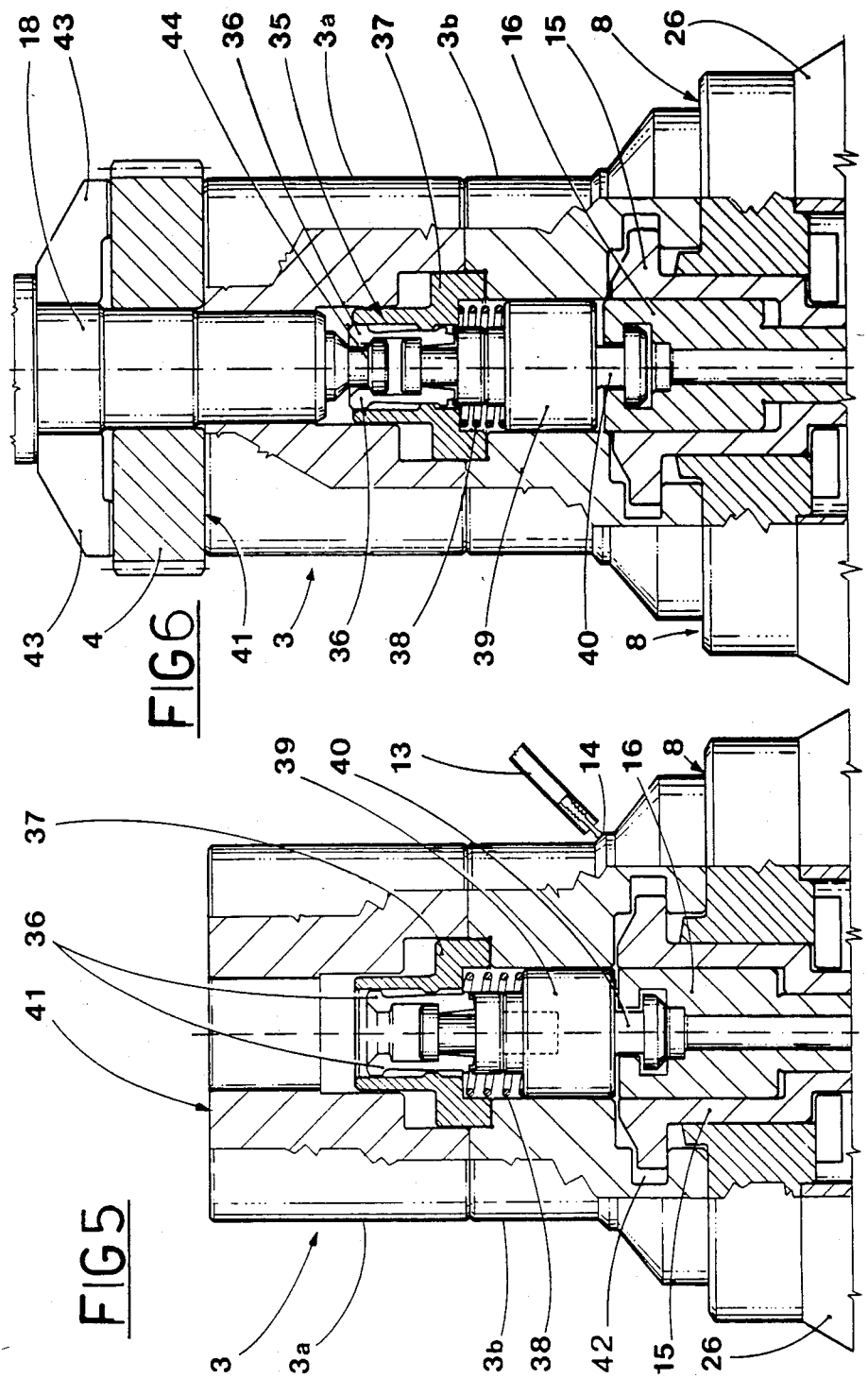

METHOD FOR AUTOMATIC CHANGEOVER OF THE WORKHOLDING DEVICE IN HOBBING MACHINES, AND MEANS FOR THE IMPLEMENTATION OF SUCH A METHOD

BACKGROUND OF THE INVENTION

The invention relates to a method for automatic changeover of the workholding device in hobbing machines, and to means for the implementation of such a method.

A significant problem encountered in hobbing machines is that of obtaining an automatic setup for work requiring workholding and location equipment other than that currently fitted; automation of setup is sought to the end of enabling long-term unassisted operation of the machine.

The workholding equipment in modern hobbing machines consists of a rest, associated permanently with the machine and invested with such movement as must be imparted to a workpiece during hobbing, and a device, to which the work is clamped, that can be made fast to and separated from the rest at will.

In machines as currently embodied, the rest and the various devices are provided with tapers, a bore for the rest and a shank for the device, which serve for fitment and location purposes and are intended to permit swift changeover of the device.

For unmanned changeover of the device, use is made of apparatus comprising a mechanical arm which removes the device currently occupying the rest and positions whichever other device may be required for the following hobbing operation. The changeover implemented with such a method is neither simple nor swift however, inasmuch as to accomplish each transfer of a single device, the arm has to move first through a vertical, then through a horizontal direction, and then again through a vertical direction opposed to the first. Even when the arm has finally completed this complicated set of movements, faultless positioning can be hindered by swarf that may have found its way into the tapered bore of the rest during the course of the previous hobbing operation.

In order that such swarf can be removed from the tapered bore of the rest, the machine incorporates a cleaning system whereby oil is caused to circulate, flooding the bore by filling from the bottom upward and ultimately overflowing. This is a system that has proved unsatisfactory for a number of reasons, amongst which, for example, the considerable quantity of oil required, and the fact that such oil contributes to a dirty state of the machine.

A further, and more serious drawback of the cleaning system in question is the fact that swarf often will not be cleared away with the flow of oil, but cling to the locating surfaces of the bore; the presence of such foreign matter constitutes a considerable damage hazard, inasmuch as the replacement workholding device must be removed immediately, and a fresh charge of cleaning fluid sent into the bore. Repeated flooding still does not provide sufficient remedy for the removal of swarf preventing faultless location of the workholding device, however, and the attention of the operator will often be required; this results in drastic loss of a machine's facility for unmanned operation, despite the incorporation of a costly cleaning system.

The object of the invention described herein is that of overcoming the drawbacks described above.

SUMMARY OF THE INVENTION

With a method and relative means as disclosed and claimed herein, one is provided with a solution to the engineering problem in question, namely: how to avoid the use of oil or other fluids, in hobbing machines, for cleaning locating surfaces in order to guarantee the faultless positioning of workholding equipment, and at the same time dispense with the use of join-and-separate taper fits so as to gain the advantage of greater speed in changeover of the workholding device.

A further advantage of the invention claimed herein consists in the fact that the means disclosed are embodied in such a way as to ensure as limited a concentration of swarf as possible on the locating surfaces, and permit of employing a fully automatic scraper that exercises a positive cleaning action on the surface of the rest.

Another advantage, stemming from the embodiment of locating surfaces according to the invention, is that both the structure and the movement of the arm which changes over the workholding device are greatly simplified, signifying enhanced precision in operation of the arm itself.

An additional advantage is the increased ease and guarantee of alignment, between the rest and the device of the workholding equipment, given by the inclusion of two reference components in the device and of the vertical cylindrical surface on the rest.

BRIEF DESCRIPTION OF THE DRAWINGS

The invention will now be described in detail by way of example, with the aid of the accompanying drawings, in which:

FIG. 1 shows the schematic representation, viewed in plan, of a hobbing machine provided with workholding equipment according to the invention;

FIGS. 2, 3, 4, 5 and 6 are axial sections through the rest and workholding device of the machine in FIG. 1, which illustrate successive stages during cleaning of the rest, and positioning of a replacement workholding device; FIG. 4 is a cut through A—A in FIG. 1, whereas the remainder are taken through B—B.

DESCRIPTION OF THE PREFERRED EMBODIMENT

FIG. 1 shows a hobbing machine, generally denoted 25, comprising a frame 26, a hob spindle 27 and a work head 28. At a point between the spindle 27 and the work head 28, one has a work rest 6 on which to position a device 3 that holds the work to be hobbed.

In a machine according to the invention, the machine frame 26 carries a change arm 5 that serves for transfer of the single workholding devices 3, and a further arm 20 to which a cleaner 7 is fitted; a magazine positioned alongside the frame 26 incorporates a turntable 1 having three stations 2, each accommodating a workholding device 3.

The change arm 5 is pivotably mounted via one end to the machine frame 26, its remaining end exhibiting a frame 29 in the shape of a letter 'C' each of the projecting members 29a of which carries a pair of hydraulically actuated retractable parallel pins 19, the single pins of one pair disposed in axial alignment with their opposite numbers of the other pair; such pins 19 are designed to locate in corresponding sockets 30 offered by each workholding device in positions that are symmetrical in relation to the diameter of the device 3 itself and normal to the members 29a of the change arm 5.

The turntable 1 is distanced from the machine frame 26 such that the circular trajectory described by a device 3 held by the change arm 5 is tangential to the circular trajectory described by a device 3 occupying one of the stations 2 on the turntable itself. Accordingly, the turntable 1 as illustrated in FIG. 1 constitutes the equipment magazine in a preferred embodiment, though the magazine could equally well be embodied as an endless conveyor with a plurality of stations 2, remaining within the scope of the invention claimed, as long as the geometry of the trajectories of a device 3 carried by the change arm 5 and a device carried by the magazine remains as described above. Still referring to FIG. 1, each station 2 is provided with means 31 by which to lock a workholding device 3 to the turntable 1.

The work rest 6 of the hobbing machine 25 is embodied in a special fashion according to the invention, and is illustrated in FIGS. 2–6. It will be observed that the rest appears as a disk fitted to the frame 26 of the machine 25, and provided with a central, upwardly projecting annular boss 32 for locating purposes. The top surface 8 of the rest 6 and the cylindrical surface 9 of its annular boss 32 are machined such as to offer perfect horizontal and vertical references, respectively, to a workholding device 3 positioned on the rest. 16 and 15 denote the coaxially disposed rods, respectively inner and outer, of two relative coaxial fluid power cylinders (not illustrated). The end of the inner rod 16 which projects from the rest 6 exhibits an axial bore 33 provided with a widened section 34 for the accommodation of a Tee shank end, and with a radial slot. The projecting end of the outer rod 15 is T-shaped, and provided with a slot (conventional, therefore not illustrated) that matches the slot of the inner rod 16 affording passage to the Tee shank end. For reasons which will become apparent, the T-shape of the projecting end of the outer rod 15 overlaps the annular locating boss 32. The rest 6 also comprises a radial hole (see FIG. 4) located exactly at right angles to the slot providing access to the bore 33 of the inner rod 16, which accommodates an alignment mechanism consisting of a plunger 23 that lies below the level of the top horizontal surface 8. The plunger 23 is spring loaded by a set of belleville disks 24 that bias it toward the center of the rest 6, and rotated about its longitudinal axis by further means (not illustrated); 22 denotes an appendage, integral with the plunger 23, that will project upward beyond the level of the horizontal surface 8 when the plunger is rotated, for a purpose that will become clear in due course.

The arm denoted 20 is pivotably mounted via one end to the frame 26 of the hobbing machine 25, and carries a cleaner 7 at its remaining end. In the illustration of FIG. 2, the cleaner 7 appears as a flat scraper attached to the arm 20, though a more thorough action would be provided by a rotary brush, or by any other means which satisfy the requirements shortly to be described. The arm 20 is rotated about a vertical axis from a position outside the area occupied by the rest 6, to a working position in which the cleaner 7 engages both the horizontal surface 8 and the vertical surface 9 of the work rest. In the embodiment illustrated in FIG. 2, the scraper 7 is attached to the arm 20 in such a way as to lie substantially tangential to the locating boss 32 when in the working position.

A workholding device 3 (FIGS. 3–6) may consist of two sections 3a and 3b, arranged coaxially one on top of the other, and provided with an axial bore in which to accommodate a chuck 35 (see FIG. 6). Such a chuck 35, incorporating a pair of jaws 36, a housing 37, a bias spring 38 and a piston 39, would be of conventional type, offering a shank 40 that locates in the bore 33 of the inner cylinder rod 16. The bottom section 3b of the workholding device 3 exhibits a flat underside 10 disposed exactly parallel with the top side 41 of the top section 3a supporting the work 4, and exactly perpendicular to its own vertical axis. The axial bore 12 of the bottom section 3b has a widened section at bottom accommodating the annular locating boss 32 of the rest 6, and an annular recess 42 accommodating the T-shaped extremity of the outer rod 15, which gains the inside of the bore 12 via a slot 12a (FIG. 4) extending from the bore to the lateral outer surface of the bottom section 3b. 11 denotes a pair of reference components (one only of which appears in FIG. 4) at the side of the bottom section 3b of the device 3 opposite the slot 12a, which are disposed symmetrically relative to the longitudinal axis of the slot 12a, and locate against the annular boss 32. Such reference components 11 may take the form of separate inserts, as in FIG. 4, machined in such a way that the surface directed toward the axis of the bottom section 3b of the device will mate perfectly with the surface of the annular boss 32, thereby ensuring a faultless coaxial relationship between device 3 and rest 6. The bottom section 3b of the device also incorporates a roller 21, located outwardly of and in alignment with the pair of reference components 11, with which the appendage 22 of the plunger 23 engages when rotated.

13 denotes a sensor (see FIG. 5) capable of longitudinal movement such as will bring it into contact with a beveled surface 14 offered by the bottom section 3b of the workholding device 3. Such a sensor 13 constitutes a part of the control circuitry operating a hobbing machine 25 provided with the workholding equipment disclosed, and connects with a comparator circuit. Signals relayed by the sensor 13 thus give indication of any positioning error between device 3 and rest 6.

The equipment disclosed will also comprise means for operation of the change arm 5, the cleaner arm 20 and the turntable 1; these are omitted from the drawings however, being conventional.

The hobbing machine 25 will be provided with an arbor 18 (FIG. 6) comprising a plate 43 for clamping the work 4 and a Tee shank end 44 gripped by the jaws 36 of the chuck 35, as well as with other components and control circuits that are omitted from the drawings, being conventional in embodiment.

Operation of the equipment disclosed will now be described referring to the drawings in numerical sequence. Observing FIG. 1, the change arm 5 is rotated clockwise (see arrow f1) from the position denoted III, lying in neutral area occupied neither by the machine 25 nor the turntable 1, to the position denoted I at which a workholding device 3 is picked up from the rest 6. This movement accomplished, the hydraulically actuated pins 19 are extended in order to locate in the respective sockets 30 of the workholding device 3. Assuming the device 3 to be in the released state at this stage, the change arm 5 is rotated counterclockwise (arrow f1) into the position denoted II, indicating one of the stations 2 of the turntable 1, whereupon the device 3 is locked to the turntable 1 by means denoted 31, and the arm rotates further in the counterclockwise direction f1 to regain its initial position III. The turntable 1 now indexes, thus bringing another device 3 into the position denoted II. At the same time as the change arm 5 returns from position I to position III and then re-approaches position I, the cleaner arm 20 is rotated in the direction arrowed f2 so as to bring the scraper 7 into contact with the horizontal and vertical surfaces 8 and 9 of the work rest 6 (see FIG. 2); the rest 6 is now rotated clockwise (FIG. 1), and with the scraper 7 located in the position described, swarf and dust will be removed from the two surfaces 8 and 9 by the scraping action produced. With the programmed cleaning time lapse completed, the scraper 7 is returned to its at-rest position outside the area occupied by the rest 6. The change arm 5 is rotated clockwise through f1, picking up a replacement device 3 from the turntable and transferring it to the rest 6; this is the configuration illustrated in FIG. 3, in which the device 3 does not physically sit on the rest 6, but remains suspended a short distance thereabove by the arm 5. With the device 3 transferred to the rest 6, the plunger 23 (see FIG. 4) is rotated about its longitudinal axis, bringing the appendage 22 (broken line) to bear on the roller 21 associated with the bottom section 3b of the device; the appendage 22 covers a relatively wide angle in order to afford a generous stretch of contact with the roller 21. The instant that the appendage 22 and the roller 21 are brought into contact, the belleville disks 24 compress, and respond by urging the entire workholding device 3 toward the center of the rest 6 until the reference components 11 make full contact with the cylindrical surface of the annular boss 32; this accomplished, faultless coaxial relationship between device 3 and rest 6 is assured. The workholding device 3 is still supported by the change arm 5 at this point, though movement occasioned by the belleville disks 24 is markedly limited, and in no way interferes with hydraulic retraction of the pins 19. The device 3 is now locked onto the rest 6 (see FIG. 5) by lowering the outer cylinder rod 15 such that its T-shaped end engages the annular recess 42 of the bore 12 offered by the bottom section 3b of the device 3. The change arm 5 is now rotated back into position III, and the sensor 13 brought into contact with the beveled surface 14 offered by the workholding device 3. Should the sensor 13 detect any error in relative positioning of the device 3 and the rest 6 that falls within prescribed tolerances, then the sensor itself will relay a signal enabling the positioning procedure's continuation; where tolerances may be exceeded, a signal is given instructing removal of the device 3 from the rest 6, and the positioning steps described thus far are repeated. No error being detected, a workpiece 4 is set down on the uppermost surface 41 of the top section 3a (see FIG. 6) by means which are not illustrated, and do not fall within the scope of the disclosure. Finally, the arbor 18 assembly is lowered into position by the work head 28, the plate 43 is urged against the work 4, and the Tee shank end 44 located between the jaws 36 of the chuck 35. The inner rod 15 can now be lowered in order to chuck the shank 44 of the arbor 18 tightly and pull the plate 43 down onto the work 4, hence onto the workholding device 3; the work 4, the device 3 and the rest 6 are thus firmly locked together.

The equipment thus described might also be embodied to effect a dual changeover either side of a horizontal plane, the workholding device 3 being replaced with a bottom set of components, and the arbor with a top set of components, adopting similar positioning methods.

What is claimed:

1. Apparatus for automatic changeover of a detachable workholding device in a hobbing machine having a rotatable work rest, comprising a vertical axis equipment magazine having at least two stations to hold workholding devices, a change arm pivotably secured to said hobbing machine for transferring a workholding device to said work rest, said arm being rotatable through a horizontal plane from a first limit position in which the workholding device is substantially positioned on the work rest, via an intermediate position in which the workholding device occupies one of the stations of the magazine, to a second limit position in which the change arm lies outside the area occupied by the magazine, said work rest being provided with a horizontal surface that affords support and a means of location to the flat horizontal underside of the workholding device, and a vertical cylindrical surface projecting upward from the horizontal surface, which affords a stop against which at least one reference component offered by the workholding device may locate to the end of ensuring coaxial alignment, a scraper pivotally supported on said hobbing machine for cleaning the horizontal end vertical surfaces of the work rest, a sensor mounted on said machine and means for moving said sensor to bring it into contact with a beveled surface on the workholding device to detect any positioning error between the workholding device and the work rest, means for releasing said positioned workpiece, and means for clamping said workholding device on said work rest.

2. Apparatus according to claim 1, wherein each workholding device is provided with a roller, positioned outwardly of and between two reference components, having a vertical axis, and urged flexibly toward the center of the work rest by the appendage of an alignment mechanism, wherein the alignment mechanism is incorporated into the work rest, radially disposed, and made to rotate about its own longitudinal axis.

3. Apparatus according to claim 2, wherein the alignment mechanism is a spring-loaded plunger.

4. Apparatus according to claim 1, wherein one end of the change arm is pivotably mounted, whereas the remaining end has projecting members which exhibit a stretch in the shape of a letter 'C', each of the projecting members of which carries a pair of retractable parallel pins, the single pins of one pair disposed in axial alignment with the corresponding pins on the opposite pair and designed to locate in corresponding sockets offered by each workholding device in positions that are symmetrical in relation to the diameter of the device and normal to the projecting members of the change arm.

5. Apparatus according to claim 1, wherein each station of the equipment magazine is provided with means for securing a single workholding device.

6. Apparatus according to claim 1, wherein the equipment magazine is embodied as a turntable with three stations.

7. Apparatus according to claim 1, wherein the scraper operates simultaneously on the horizontal and vertical surfaces of the work rest, and is attached to a cleaner arm that moves through a horizontal plane from a first limit position, in which it lies outside the area occupied by the work rest, into a second limit position in which the scraper becomes operative and is disposed substantially tangential to the vertical surface of the work rest.

8. Apparatus according to claim 7, wherein the scraper is alternatively embodied as a rotary brush carried by the cleaner arm, moving through a horizontal plane between two limit positions.

9. Apparatus according to claim 1, wherein the components by way of which to secure the workholding device to the work rest consist in the T-shaped extremity of a rod of a fluid power cylinder, coaxial with the work rest, which rod projects upward beyond the top of the work rest so as to locate in an annular recess offered by an axial bore of the workholding device, and wherein the T-shaped extremity gains the inside of the bore by way of a radial slot extending from the bore to the outer surface of the workholding device.

10. Apparatus according to claim 9, wherein means are provided internally of and coaxial with the rod of the fluid power cylinder, which means clamp an arbor of the hobbing machine, operating by way of the axial bore in the workholding device.

11. Apparatus according to claim 10, wherein means which clamp the arbor of the hobbing machine consist in a chuck and a further fluid power cylinder the rod of which exhibits an axial bore at its projecting end designed to engage the Tee shank end of the chuck, wherein each workholding device is embodied in two sections arranged coaxially one on top of the other, and houses a respective chuck, the remaining end of which engages and locks the Tee shank end of the arbor, and wherein the projecting end of each rod is provided with a radial slot by way of which the Tee shank end of the chuck is afforded access to the axial bore of the inner rod.

12. A method for automatic changeover of the workholding device in hobbing machines which comprise a rotatable work rest and a detachable workholding device,
supplying workholding devices, to a vertical axis equipment magazine having at least two stations,
providing a change arm for grasping a workholding device and moving it from said magazine to said rotatable work rest,
providing a horizontal surface on said work rest to support and locate said workholding device,
placing said workholding device on said horizontal surface,
providing a vertical cylindrical surface projecting from said horizontal surface to provide a stop for the movement of said change arm to ensure a coaxial alignment,
scraping said horizontal and vertical surfaces on the work rest prior to placing a new workholding device on said work rest,
sensing the placing of said workholding device on said work rest to detect any positioning error between said workholding device and the work rest,
releasing said workholding device after correctly positioning it on said work rest, and
clamping said workholding device on said work rest.

13. Method as in claim 12, wherein the change arm is disposed at a height such that said workholding device is suspended a short distance above the horizontal surface of the work rest when the arm is in a first limit position.

14. A method according to claim 12, including the step of sensing a position error and repeating positioning before releasing said workholding device.

15. A method according to claim 14, including the steps of rejecting said workholding device after repositioning fails to overcome the position error, and actuating said change arm to pick up another workholding device from said magazine.

* * * * *